United States Patent
Park et al.

(10) Patent No.: US 11,240,676 B2
(45) Date of Patent: Feb. 1, 2022

(54) ANALYSIS METHOD AND APPARATUS FOR DISTRIBUTED-PROCESSING-BASED NETWORK DESIGN IN WIRELESS COMMUNICATION SYSTEM

(71) Applicant: Samsung Electronics Co., Ltd., Suwon-si (KR)

(72) Inventors: Jungmin Park, Seoul (KR); Byungchul Kim, Seongnam-si (KR); Youngju Lee, Seoul (KR); Dongkyu Choi, Seongnam-si (KR); Junghwan Choi, Yongin-si (KR); Seungku Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/641,463

(22) PCT Filed: Sep. 11, 2018

(86) PCT No.: PCT/KR2018/010625
§ 371 (c)(1),
(2) Date: Feb. 24, 2020

(87) PCT Pub. No.: WO2019/066309
PCT Pub. Date: Apr. 4, 2019

(65) Prior Publication Data
US 2020/0187016 A1      Jun. 11, 2020

(30) Foreign Application Priority Data
Sep. 27, 2017  (KR) ........................ 10-2017-0125090

(51) Int. Cl.
*H04W 16/18* (2009.01)
*H04W 16/24* (2009.01)
(Continued)

(52) U.S. Cl.
CPC ........... *H04W 16/18* (2013.01); *H04W 16/24* (2013.01); *H04W 24/02* (2013.01); *H04W 64/003* (2013.01)

(58) Field of Classification Search
CPC ..... H04W 16/18; H04W 16/24; H04W 24/02; H04W 64/003
See application file for complete search history.

(56) References Cited

U.S. PATENT DOCUMENTS 5,574,466 A * 11/1996 Reed ........................ G01S 3/00
                                                                342/359
6,947,708 B2    9/2005 Fattouch
(Continued)

FOREIGN PATENT DOCUMENTS

CN    104349334 A    2/2015
EP    1 613 111 A2   1/2006
(Continued)

OTHER PUBLICATIONS

Roland Götz: "Radio Network Planning Tools Basics, Practical Examples & Demonstration on NGN Network Planning Part I Regional Seminar on evolving network infrastructures to NGN and related Planning Strategies and Tools, for the CEE, CIS and Baltic States", Jun. 24, 2005 (Jun. 24, 2005), pp. 1-31, XP055729887, Retrieved from the Internet: URL:https:11www.itu.i ntlITU-D/tech/events/2005/Belg rade-05/Day%2041Belgrade_6_5.pdf [retrieved on Sep. 11, 2020].

(Continued)

*Primary Examiner* — Julio R Perez
(74) *Attorney, Agent, or Firm* — Jefferson IP Law, LLP

(57) ABSTRACT

The present disclosure relates to a communication technique for the convergence of IoT technology and a 5G communication system for supporting a higher data transfer rate than a 4G system, and a system therefor. The present disclosure can be applied to intelligent services (e.g., smart homes, (Continued)

smart buildings, smart cities, smart or connected cars, health care, digital education, retail business, and services associated with security and safety) on the basis of 5G communication technology and IoT-related technology. Disclosed is an analysis method and apparatus for performing an analysis procedure for network design at an improved speed while maintaining accuracy and reliability.

12 Claims, 14 Drawing Sheets

(51) Int. Cl.
*H04W 24/02* (2009.01)
*H04W 64/00* (2009.01)

(56) References Cited

U.S. PATENT DOCUMENTS

| | | | |
|---|---|---|---|
| 7,945,435 B2 | 5/2011 | Sugahara | |
| 8,209,038 B2 | 6/2012 | Gustafsson et al. | |
| 8,428,171 B2 | 4/2013 | Fettweis et al. | |
| 9,184,859 B2 | 11/2015 | Jung et al. | |
| 9,641,263 B2* | 5/2017 | Jones | H04W 16/18 |
| 10,952,082 B2* | 3/2021 | Godor | H04W 16/22 |
| 2006/0009207 A1 | 1/2006 | Chen et al. | |
| 2006/0070113 A1 | 3/2006 | Bhagwat et al. | |
| 2008/0318583 A1 | 12/2008 | Guill, Jr. | |
| 2010/0056163 A1 | 3/2010 | Schmidt et al. | |
| 2016/0037357 A1 | 2/2016 | Barbosa Da Torre et al. | |
| 2016/0269911 A1 | 9/2016 | Cheng et al. | |
| 2021/0088325 A1* | 3/2021 | Shchegrov | H05G 2/003 |
| 2021/0089238 A1* | 3/2021 | Muniswamy-Reddy | G06F 3/0659 |

FOREIGN PATENT DOCUMENTS

| | | |
|---|---|---|
| JP | 2001-285923 A | 10/2001 |
| JP | 2006-191699 A | 7/2006 |
| JP | 2012-169838 A | 9/2012 |
| JP | 2014-154985 A | 8/2014 |
| KR | 10-2010-0063319 A | 6/2010 |
| KR | 10-1425822 B1 | 8/2014 |
| KR | 10-2016-0088607 A | 7/2016 |
| KR | 10-1744306 B1 | 6/2017 |
| WO | 2015/097480 A1 | 7/2015 |

OTHER PUBLICATIONS

Extended European Search Report dated Sep. 21, 2020, issued in European Patent Application No. 18860520.8.
European Office Action dated Dec. 8, 2021, issued in European Application No. 18860520.8.

* cited by examiner

ANALYSIS METHOD AND APPARATUS FOR DISTRIBUTED-PROCESSING-BASED NETWORK DESIGN IN WIRELESS COMMUNICATION SYSTEM

TECHNICAL FIELD

The disclosure relates to a wireless communication system and, more particularly, to an analysis method and apparatus for a network design in a wireless communication system. More specifically, the disclosure relates to an analysis method and apparatus for a network design based on distributed processing.

BACKGROUND ART

In order to satisfy a wireless data traffic demand that tends to increases after the 4G communication system commercialization, efforts to develop an improved 5G communication system or pre-5G communication system is being made. For this reason, the 5G communication system or pre-5G communication system is called a beyond 4G Network communication system or a post LTE system.

In order to achieve a high data transfer rate, the 5G communication system is considered to be implemented in an mmWave band (e.g., 10 to 60 GHz bands). In order to mitigate a path loss of the radio waves and increase the transmission distance of the radio waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an evolved small cell, an advanced small cell, a cloud radio access network (cloud RAN), an ultra-dense network, device to device communication (D2D), wireless backhaul, a moving network, cooperative communication, coordinated multi-points (CoMP) and interference cancellation, are being developed in the 5G communication system.

In addition, hybrid FSK and QAM modulation (FQAM) and sliding window superposition coding (SWSC), that is, advanced coding modulation (ACM) schemes, and filter bank multi-carrier (FBMC), non-orthogonal multiple access (NOMA), and sparse code multiple access (SCMA), that is, advanced access technologies, are being developed in the 5G system.

Meanwhile, the Internet evolves from a human-centered connection network over which human generates and consumes information to Internet of Things (IoT) in which exchanges and processes information between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology, and security technology, are necessary. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of the convergence of the 5G technology and the IoT technology.

In the 5G communication system, the use of a high frequency band compared to a conventional technology is taken into consideration. A high frequency band may have a great path loss because the wavelength of a signal is short. Accordingly, such an electromagnetic wave characteristic needs to be accurately incorporated into an analysis process for a network design. Due to the electromagnetic wave characteristic, reliable results may be obtained only if an influence on a change in the electromagnetic wave, such as reflection, transmission, diffraction, and scattering attributable to surrounding geographic features, is accurately incorporated when a network design is performed.

DISCLOSURE OF INVENTION

Technical Problem

The disclosure has been derived to solve such problems, and provides the accuracy and speed of analysis results for the location where a base station is installed and the number of base stations when a network design is performed.

The disclosure is to improve the speed and accuracy of a full analysis process that requires a relatively long time by splitting an analytical region into a plurality of regions and performing an analysis process on the split regions.

Solution to Problem

According to an embodiment of the disclosure, an analysis method includes obtaining map data for an analytical region, determining a plurality of split regions from the analytical region using the map data, setting a condition for simplified analysis with respect to the plurality of split regions, and performing simplified analysis on each of the plurality of split regions based on the condition.

According to an embodiment of the disclosure, a computing apparatus for performing an analysis method includes a transceiver transmitting and receiving information and a controller configured to obtain map data for an analytical region, determine a plurality of split regions from the analytical region using the map data, set a condition for simplified analysis with respect to the plurality of split regions, and perform simplified analysis on each of the plurality of split regions based on the condition.

Advantageous Effects of Invention

According to an embodiment proposed in the disclosure, realistic results in which the electromagnetic wave characteristic of a communication system using a high frequency band has taken into consideration can be obtained.

According to another embodiment proposed in the disclosure, the time taken for a full analysis process can be reduced and the reliability and accuracy of results can be improved by performing distributed processing into which the characteristic of a given area has been incorporated.

MODE FOR THE INVENTION

Figure 1:
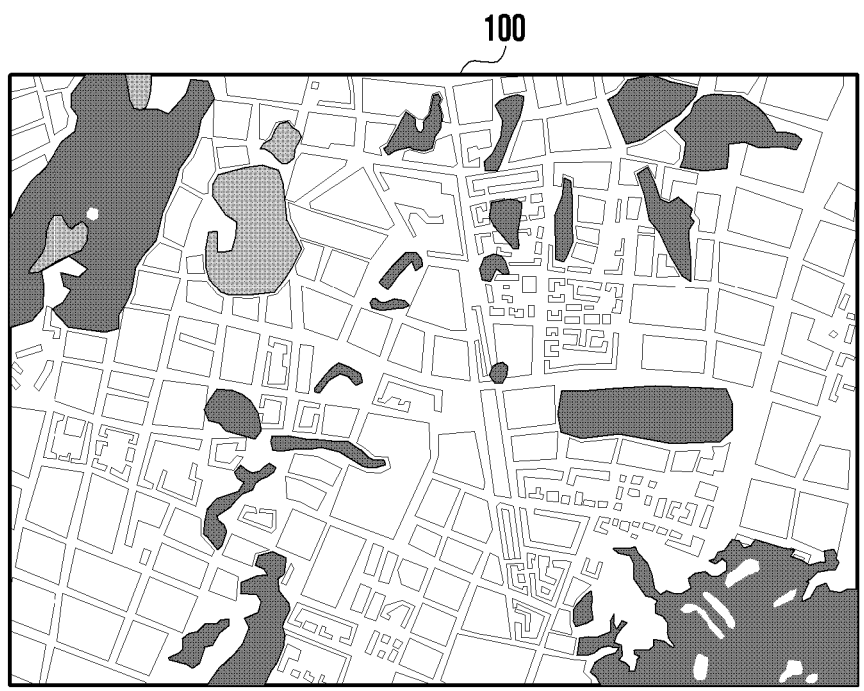
FIG. 1 is a diagram illustrating a network design (or cell design) method.

Various embodiments of this disclosure are described below in detail with reference to the accompanying drawings. It is to be noted that the same reference numbers are used throughout the drawings to refer to the same elements. Furthermore, a detailed description of known functions or constructions that may make the gist of this disclosure vague is omitted.

In this specification, in describing embodiments, a description of contents that are well known in the art to which the disclosure pertains and not directly related to the disclosure is omitted in order to make the gist of the disclosure clearer. The reason for this is to more clearly deliver the gist of the disclosure without making it obscure by omitting an unnecessary description.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as an FPGA or an ASIC, and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

Hereinafter, preferred embodiments of the disclosure will be described in detail with reference to the accompanying drawings.

FIG. 1 is a diagram illustrating a network design (or cell design) method. The network design (or cell design) means a process of selecting the location where a base station will be installed within a given area based on a request from a communication network provider. That is, a candidate location where a plurality of base stations will be installed may be determined through a network design process. When the candidate location is determined, the number candidate of base stations to be installed in a corresponding area may be determined.

An analysis method for a conventional communication system is a method based on a statistical model (Loss/m). In setting the distance between base stations, the reachable radius of a signal, such as a hexagonal cell shape, has been assumed to be relatively constant. However, in the case of a 5G communication system using a high frequency band as described above, a great path loss occurs in terms of its electromagnetic wave characteristic. Accordingly, a new analysis method is necessary because it is difficult to secure the accuracy of analysis results if an analysis method for a conventional communication system is applied without any change.

Accordingly, a ray tracing (RT) method is used as an analysis method for the network design of a new communication system. The RT method has an advantage in that results in which an electromagnetic wave characteristic is taken into consideration in addition to a local characteristic can be derived because analysis is performed by taking into consideration the path of an electromagnetic wave changed due to a structure, such as a building or a tree, within an area and the characteristics of the area. That is, in the RT method, a plurality of rays transmitted in a sphere form of 360° from a given transmission location within a map 100 of a given area illustrated in FIG. 1 is taken into consideration. The transmission, reflection and diffraction of a ray are computed for each path.

In the RT method, a long time is taken for the computation process in order to derive such an advantage. That is, a long analysis time is taken to obtain accurate results because the transmission, reflection and diffraction of a ray transmitted to a given path need to be separately computed by taking into consideration a structure on the path.

In order to solve such a problem, FIGS. 2 to 12 propose embodiments for improving an analysis process according to the RT method. According to a proposed embodiment, a region (or analytical region), that is, a target of analysis, is split (or, divided) into a plurality of regions (hereinafter split regions or divided regions). The entire analysis process is performed if each of the split regions satisfied a given condition. In other words, a full analysis process that occupies a relatively large portion of a total time is limitedly performed because whether the split regions satisfy the given condition is confirmed before a full analysis process (or full simulation process) is performed. The entire analysis process may be performed if it is recognized that the reliability of corresponding results has been secured through the split regions. That is, according to a proposed embodiment, the waste of time which may occur because a full analysis process is unnecessary performed several times can be minimized.

In this case, the proposed analysis method (i.e., a network design method according to the RT method) may be performed in a base station and/or a separate server (computing apparatus or device). Hereinafter, it is described that a server (device or computing apparatus) for a network design is provided and performs analysis methods to be described, but the disclosure is not limited such contents. That is, analysis methods according to proposed embodiments may be performed in a base station, or may be performed in such a manner that the methods are performed by both a base station and a server and corresponding results are shared.

Figure 2:
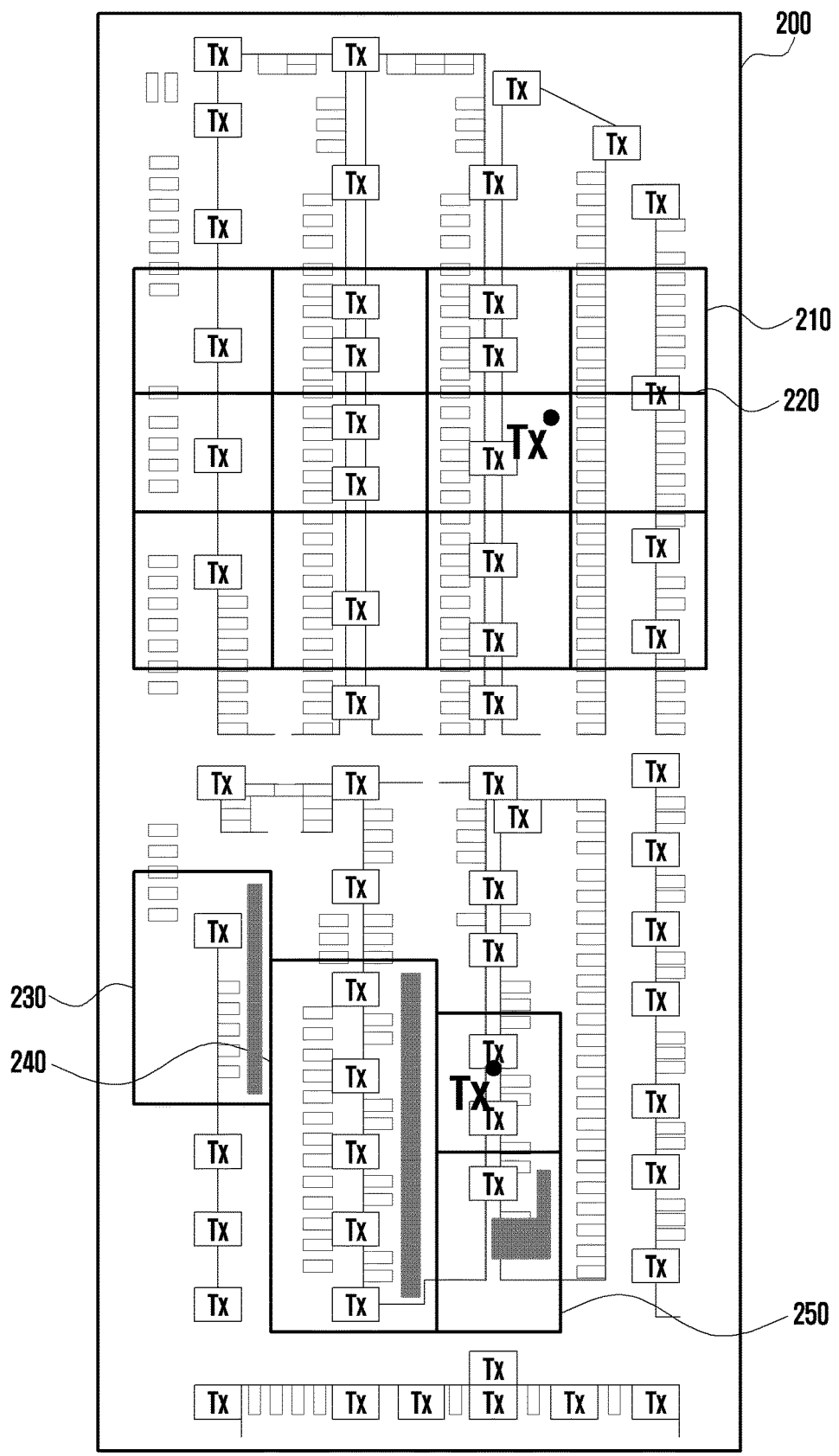
FIG. 2 is a diagram illustrating a network design method according to a proposed embodiment.

FIG. 2 is a diagram illustrating an analysis method according to a proposed embodiment. A process of splitting a given area, that is, an analysis target, into a plurality of regions is specifically described with reference to FIG. 2.

First, a server (or computing apparatus) performing an analysis method for a network design obtains the map data of an area, that is, a target of analysis. An area corresponding to the map data obtained by the server is illustrated in FIG. 2 as an example (200). The map data may be received from an external entity for storing and managing a map, and may be data autonomously retained or managed by a computing apparatus (e.g., server) that performs network designs.

The server that performs the analysis method for a network design splits an analytical region, shown in the map data, into a plurality of regions. The server may split the analytical region using an algorithm or program stored therein, and may split the analytical region by taking into consideration information on a topographic feature located in the analytical region or information on performance of a base station to be positioned. The reason for this is that the RT method is to be performed on the entire analytical region only if it is expected that the reliability of results according to the RT method is sufficient because such a split process requires a long time for a computation process if the RT method is applied to the entire analytical region. In other words, this is for obtaining a desired result value by only one analysis of the entire region if a given condition is satisfied through a simplified analysis process for the split regions.

A process of splitting an analytical region is specifically described. The server splits the analytical region by taking into consideration information on factors, such as a tree, a forest, topography, a building, and a structure located within an area, which may affect the progress of an electromagnetic wave within the analytical region. The information on the factors is a value included in map data, and may be extracted from the map data. The server may separately obtain the map data.

Furthermore, the server may split the analytical region by taking into consideration information (e.g., parameter) related to a transmission stage and reception stage to be located within the analytical region. The information related to the transmission stage and the reception stage may include information on at least one of the bandwidth, modulation and coding scheme (MCS), number of antennas, antenna gain, number of RF chains, transmission power for each RF chain, effective isotropic radiated power (EIRP), noise figure (NF) and sensitivity of the transmission stage and/or the reception stage. Furthermore, the information related to the transmission stage and the reception stage may also include a value of the number of subscribers that is expected within the analytical region.

The aforementioned information is used for the server to determine how each split region will be specified in the process of splitting the analytical region into the plurality of split regions. That is, if the number of subscribers located within a given area exceeds maximum power that may be supported by one transmission stage, a new split region needs to be added. Alternatively, although the number of users located within a given region is expected to be small, the server may need to split the given region as a new split region if there is an area that it is difficult for an electromagnetic wave to sufficiently reach due to a limited topography.

The example illustrated in FIG. 2 is specifically described. The server may perform a split process on a region 210 in a process of splitting the entire analytical region into a plurality of split regions. In the region 210, multiple buildings are deployed in a row with relatively constant tendency. Furthermore, there is no structure which may hinder the progress of an electromagnetic wave within the region 210. Accordingly, the server generates candidate regions by splitting the analytical region along buildings that are deployed in a row. One or more transmission candidate locations may be included in one candidate region. FIG. 2 illustrates results including at least one transmission candidate location within a plurality of candidate regions.

As described above, the server may take into consideration information on a transmission stage and reception stage in the process of splitting the analytical region. That is, the server may determine the number of reception stages (terminal users) that may be supported by one transmission stage when taking into consideration performance of a transmission stage (base station to be positioned), and may determine how many transmission candidate locations will be included in one candidate region.

Next, a split process for a region 230 is described as an example. In the region 230, unlike in the above example, an obstacle that hinders the progress of an electromagnetic wave, such as a high tree, structure or forest, is present within an analytical region. A heavily marked portion within a region 230, 240 or 250 indicates a factor to hinder the progress of an electromagnetic wave. The server may obtain information on a corresponding structure from map data or separately from the map data.

The server determines a split region from an analytical region by taking into consideration information on such a factor. For example, in the case of the region 230, a split region may be determined more widely if only the number of subscribers is taken into consideration. However, the server splits, as a separate region 240, a region opposite a region in which an obstructive factor is present because a factor (heavily marked tree or structure) that will hinder the progress of an electromagnetic wave is present within the region 230. Likewise, an obstructive factor is also present along the deployment of buildings within the region 240. In such a case, although a transmission candidate location within the region 240 can support more reception stages, the server may determine, as a separate split region 250, an opposite region that an electromagnetic wave cannot reach due to an obstructive factor of the region 240.

As described above, the server may set the boundary of a split region, that is, a unit of distributed processing, by taking into consideration an obstructive factor to the progress of an electromagnetic wave, such as topography or a structure. For example, the server may set a split region by complexly taking into consideration various pieces of information, such as information on the density and height of structures, information on the altitude difference and slope of topography, and information on the height of a building or the height at which a transmission stage may be installed.

A process of setting (or, configuring) a split region from the entire analytical region needs to be performed so that the speed of distributed processing is maximized. To this end, the server may set (or, configure) split regions so that they do not overlap, and may set a split region so that an omitted region is not present within the entire analytical region.

Figure 3:
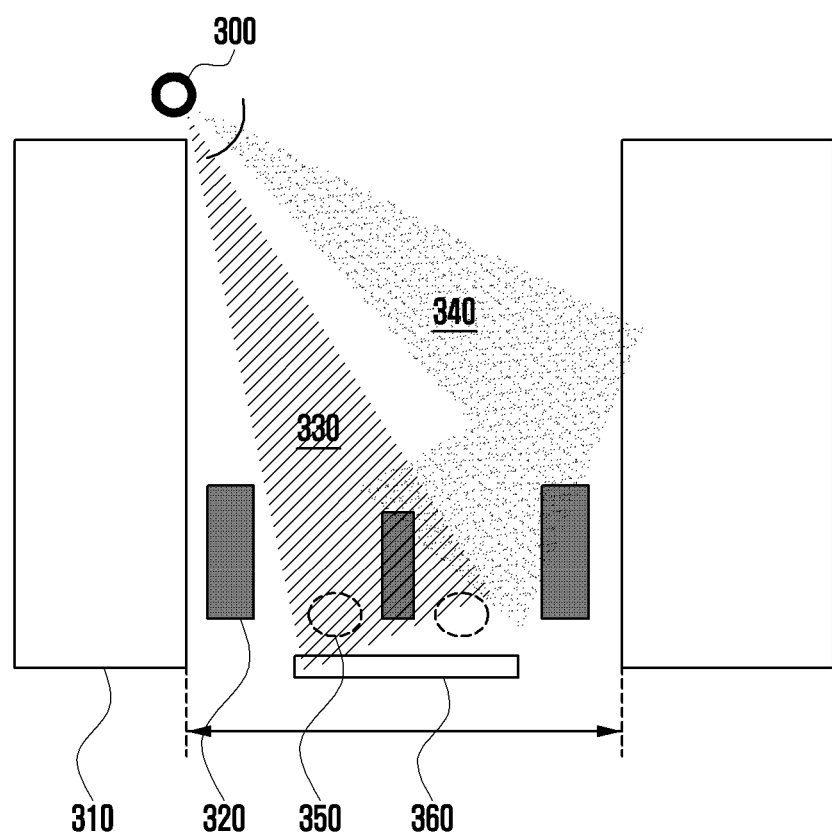
FIG. 3 is a diagram illustrating an environment to which a proposed embodiment is applied.

Next, a process of determining a transmission candidate location and a reception candidate location according to a proposed embodiment is described with reference to FIGS. 3 to 8. In FIG. 3, the communication environment of a 5G communication system related to a proposed embodiment is diagrammed. FIG. 3 illustrates a view in which a direction at the end of one side of a road is seen over the road.

In FIG. 3, 310 indicates buildings located on both sides of a road 360. Trees 320 are present at the ends on both sides of the road 360 and the center of the road 360, and hinder the progress of an electromagnetic wave. Due to such obstacles to the progress of an electromagnetic wave, there is a need for a method for the terminal (i.e., reception stage) of a user who walks on the road to transmit a signal normally.

In the embodiment illustrated in FIG. 3, there is illustrated a transmission stage 300 positioned at the top of the left building. That is, an electromagnetic wave can smoothly reach a reception stage 350 regardless of the obstacles 320 because the transmission stage is positioned at the top of the building or in the outskirt of the building. The transmission stage positioned at the top of the building or in the outskirt of the building may radiate a beam toward the center of the road 360 or transmit a signal (330). The reflection of a building on the opposite side may be used if there is a shadow region that the signal cannot reach because an obstacle is located at the center of the road 360 (340).

According to a proposed embodiment, the server may take into consideration the installation of a transmission stage at the outskirt or top of a structure as described above. The server may take into consideration a value or information, related to at least one of the beam width of a transmission stage, the installation height of the transmission stage, whether the transmission stage is to be down tilted, the range of the down tilting of the transmission stage, a road width, or the deployment of buildings, as a parameter related to the transmission stage in a process of determining the candidate location of the transmission stage.

Figure 4:
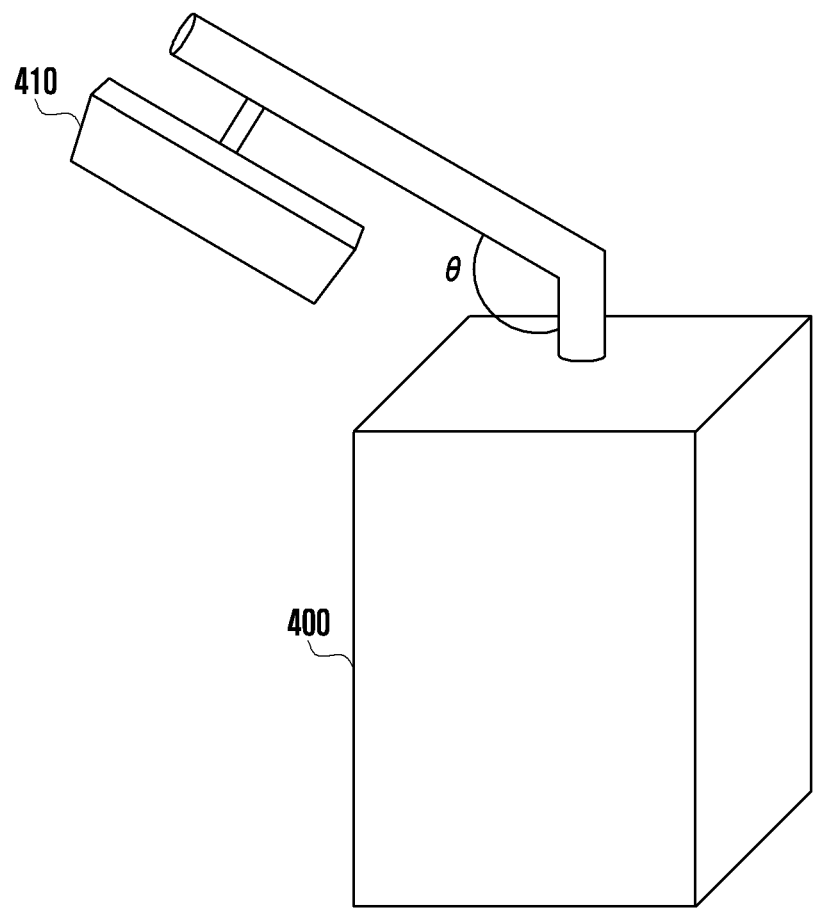
FIG. 4 is a diagram illustrating an environment to which a proposed embodiment is applied.

FIG. 4 illustrates an example of a base station installed at the top of a building. If a base station 410 is installed at the top or outskirt of a building 400 or in a structure, such as a pole, a signal may be transmitted to a reception stage by transmitting a beam toward a road. Furthermore, the base station 410 may adjust the transmission angle of a beam upward or downward based on the height of an installed structure or coverage of the base station 410 itself. Accordingly, beam transmission optimized for a provider's needs is made possible.

Figure 5:
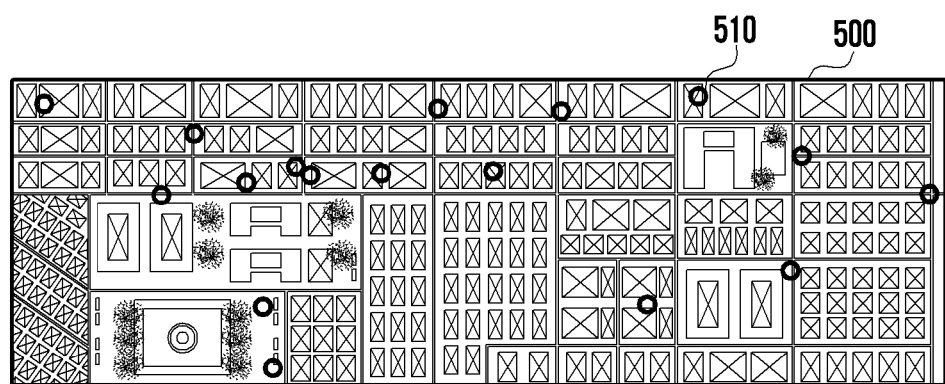
FIG. 5 is a diagram illustrating an environment to which a proposed embodiment is applied.
Figure 6:
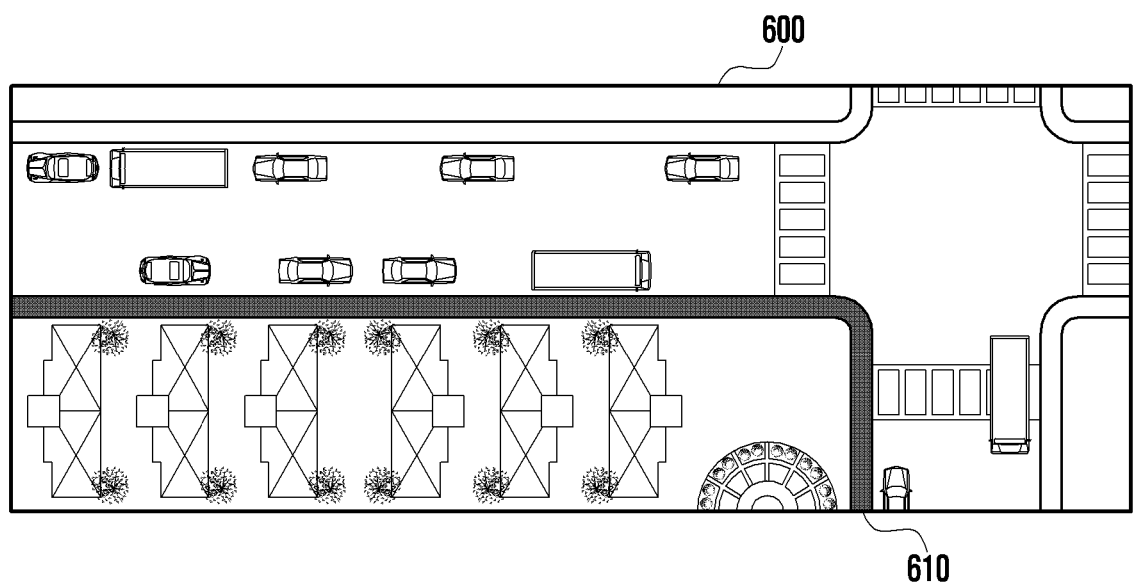
FIG. 6 is a diagram illustrating an environment to which a proposed embodiment is applied.

FIGS. 5 and 6 are diagrams illustrating a process for a server to determine a transmission candidate location and a reception candidate location using map data.

As described with reference to FIG. 4, a base station may be installed at the top or outskirt of a building or a pole or a streetlamp. That is, a transmission candidate location where the base station may be installed may correspond to any structure having a given height or more.

FIG. 5 illustrates a process for a server to determine a transmission candidate location using the map data of a given region 500. Several locations 510 illustrated in FIG. 5 indicate transmission candidate locations where transmission stages may be installed when an mmWave electromagnetic wave characteristic is taken into consideration. Parameters indicative of the height, the width of a beam to be radiated, whether a beam to be radiated needs to be down tilted, and a degree of the down tilting of a beam to be radiated may be different for each transmission candidate location.

Accordingly, the server may store and manage the aforementioned parameters in association with a plurality of candidate locations for each candidate location while setting the candidate locations in an analytical region. The server may be previously aware of the location of a transmission stage previously installed within an analytical region by a service provider. If the distance between a previously installed transmission stage and a new transmission candidate location is too close or distant, unnecessary coverage overlap or a shadow region may occur in an analytical region. Accordingly, the server may take into consideration the deployment of a previously installed base station in a process of selecting a transmission candidate location.

Furthermore, as illustrated in FIG. 5, the server may select a given location as a transmission candidate location. In contrast, as illustrated in FIG. 6, the server may select a given region formed along the contour line of a building.

In the embodiment of FIG. 6, a transmission candidate location is marked as a long region along the rooftop of a given building (610). If a transmission candidate location is determined as a region as described above, the server may determine the transmission candidate location more flexibly in a process of taking into consideration a relative distance from a peripheral transmission stage that has been previously installed.

Figure 7:
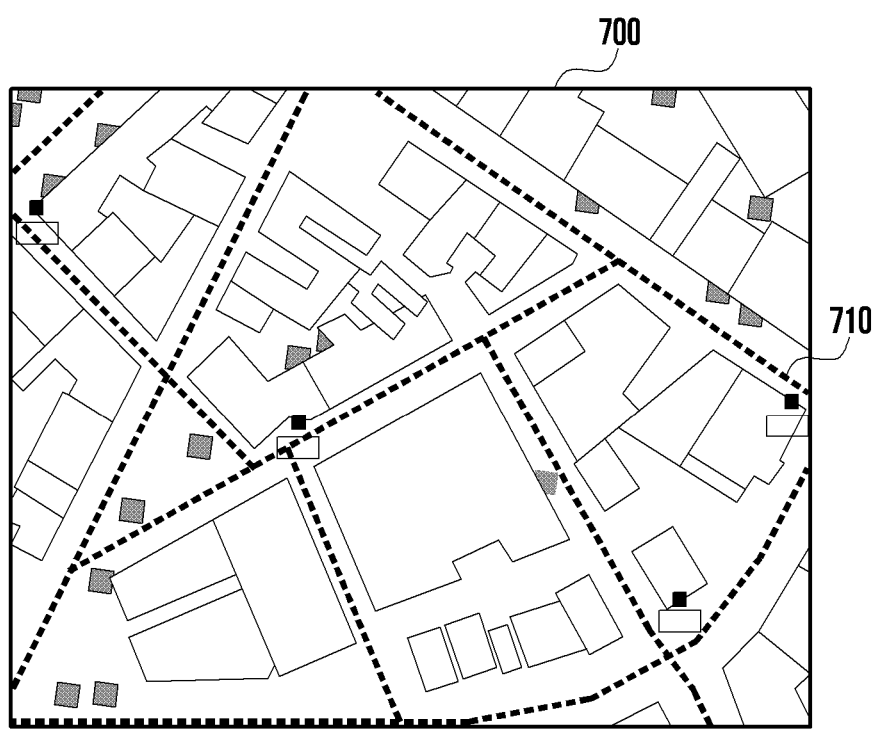
FIG. 7 is a diagram illustrating an environment to which a proposed embodiment is applied.
Figure 8:
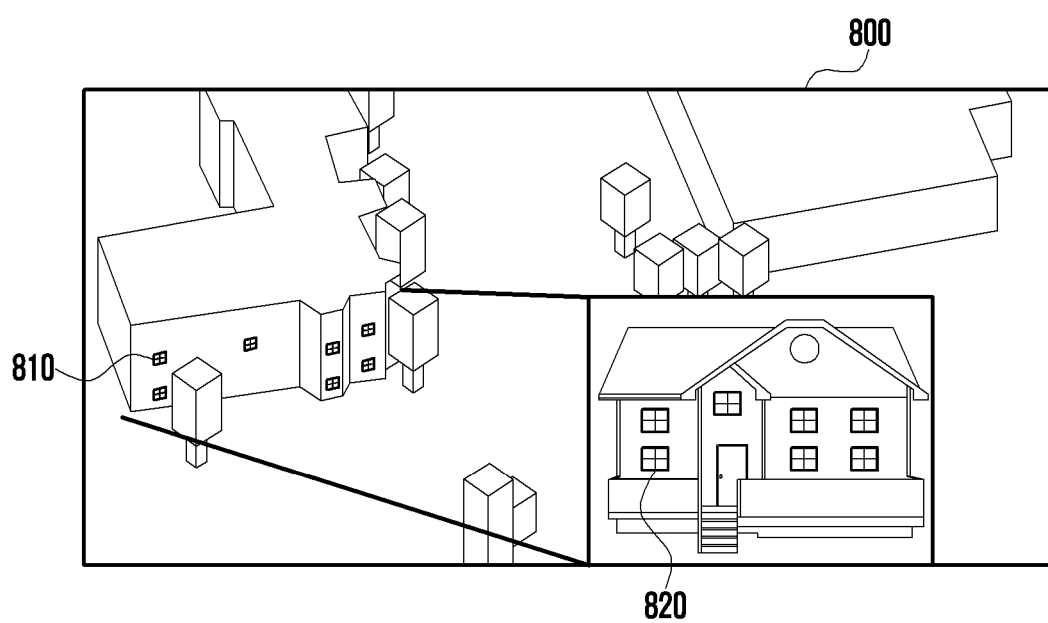
FIG. 8 is a diagram illustrating an environment to which a proposed embodiment is applied.

FIGS. 7 and 8 are diagrams illustrating a process of for a server to determine a reception candidate location. As described above, the server has to determine a transmission candidate location and a reception candidate location before performing an analysis process on split regions. According to one embodiment, a reception candidate location may be automatically determined based on a local characteristic or the deployment scenario of an area.

Specifically, for example, in an urban environment 700 illustrated in FIG. 7, there is a good probability that a reception stage may be positioned along a road. Accordingly, a condition in which reception stages are concentrated on the road (710) may be previously determined. For another example, according to a window gridding scenario 800 illustrated in FIG. 8, in order to support a user terminal located within a building, it is most efficient to transmit a signal toward the window 810, 820 of a building. Accordingly, a server may determine the window 810, 820 of the building as a reception candidate location. In such a case, information on the height and width of a window, that is, a reception candidate location, may be stored in association with each reception candidate location.

If a transmission candidate location and a reception candidate location are determined as described above, the server performs an analysis process on split regions. A process of setting condition values for analysis may be performed prior to the analysis process. Such a process is specifically described with reference to FIG. 11. The analysis process is specifically described below with reference to FIGS. 9 to 11.

Figure 9:
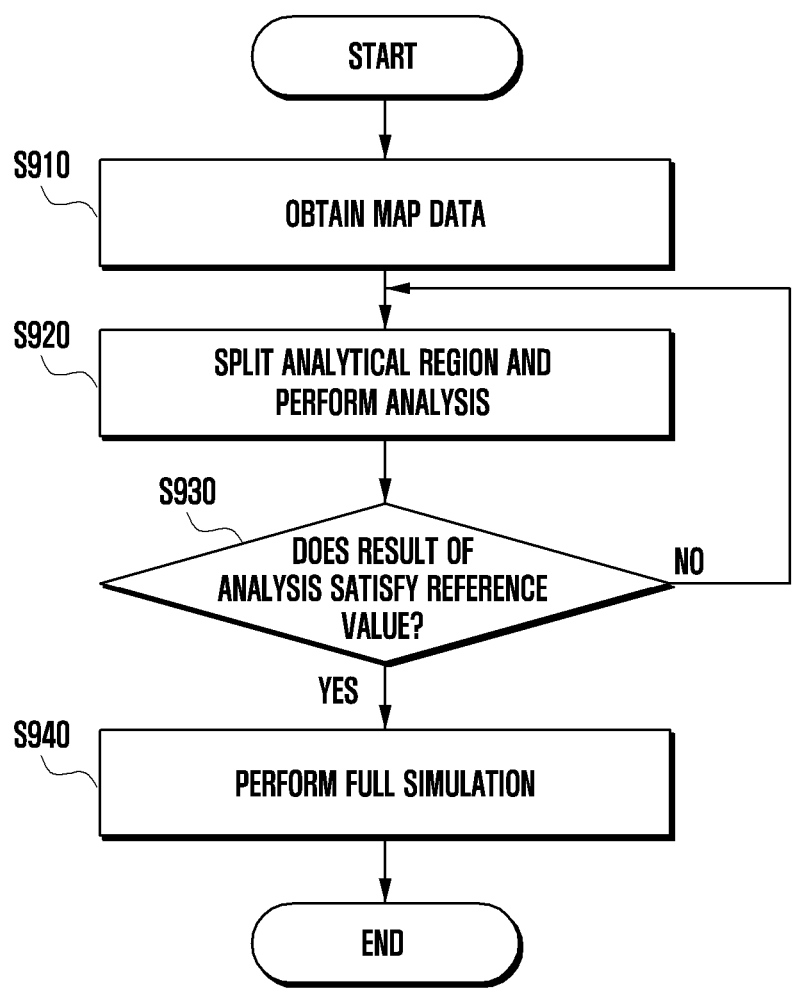
FIG. 9 is a flowchart describing an analysis method according to a proposed embodiment.

FIG. 9 is a flowchart describing an analysis method according to a proposed embodiment. A server (or computing apparatus) that performs the analysis method obtains the map data of an analytical region, that is, a target of analysis, according to the aforementioned embodiment (S910). Such map data may be a digital map or satellite map, including information on the topography of a given area, that is, a target of an analysis process for a network design, as two-dimensional and/or three-dimensional data. The map data may include, as two-dimensional and/or three-dimensional data, information on a structure located within a given area, such as a lake, a house, a tree, or a collective housing region. As described above, the map data in S910 may be received from an external entity that stores and manages the map and may be data autonomously retained and managed by the server that performs a network design.

Next, the server determines split regions by splitting an analytical region, corresponding to the map data, into a plurality of regions and. The plurality of split regions may be determined with different sizes and shapes. The server may determine the split region by taking into consideration at least one of information on the topography of the analytical region or information on a structure.

Next, the server performs analysis on each of the split regions (S920). In a process of performing the analysis, the server may take a transmission candidate location and a reception candidate location into consideration. Simplified analysis may be performed on each of the plurality of split regions.

If results analyzed for the split regions satisfy a reference value (S930), the server proceeds to S940 and performs simulations on all of the analytical regions (S940). All the simulations in S940 means analysis according to the RT method for the analytical regions, which is different from the analysis process in S920, that is, simplified analysis.

If the analyzed results do not satisfy the reference value (S930), the server performs a process of determining split regions again. That is, the server expects that reliable results will not be obtained although all simulations are performed. Accordingly, the server may adjust a transmission candidate location and a reception candidate location or differently splits the analytical region by performing a process of splitting the analytical region.

Figure 10:
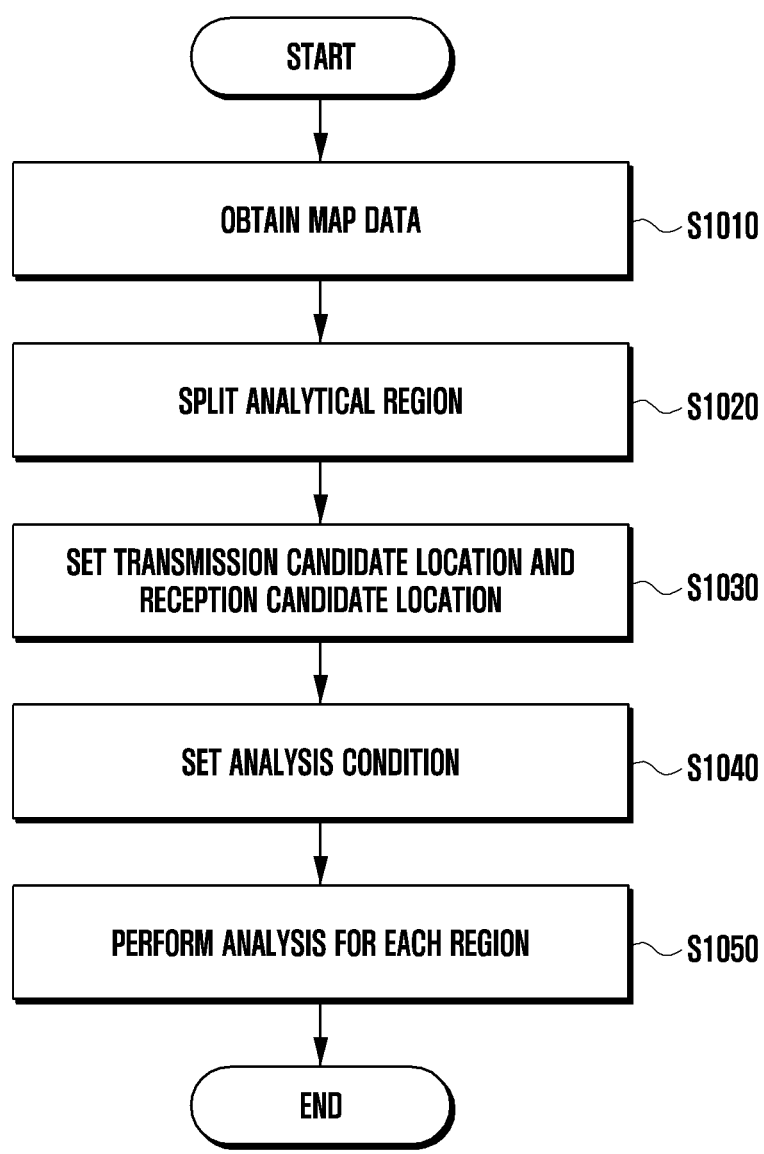
FIG. 10 is a flowchart describing an analysis method according to a proposed embodiment.

FIG. 10 describes the process S920 of FIG. 9 more specifically. The server that has obtained the map data (S1010) splits (or, divides) an analytical region into a plurality of split regions (or, divided regions) (S1020). As described above, the server may determine the split regions by taking into consideration at least one of information on the topography of the analytical region or information on a structure.

Next, the server sets (or, configures) a transmission candidate location and a reception candidate location in the analytical region (S1030). One or more transmission candidate locations may be set to be included within the plurality of split regions. The server may determine the transmission candidate location by taking into consideration a structure (e.g., a building, a pole or a streetlamp) located within the analytical region. When a communication system using a high frequency band is taken into consideration, the transmission candidate location may be set at the outskirt or top of a building or may be set in a structure capable of securing a height or more, such as a pole or streetlamp. Information and a parameter for determining the transmission candidate location may be included in the map data obtained by the server and may be obtained separately from the map data.

The server also determines the reception candidate location. The reception candidate location may be determined based on a geographical characteristic (e.g., a downtown, the peripherals of a downtown or the outskirt of a downtown) in the analytical region or a deployment scenario (e.g., window gridding) applied to the analytical region. The server may determine the reception candidate location based on previously stored information. When the reception candidate location is determined, the server may also determine the number of reception stages to be positioned within the analytical region.

Step S1020 for the server to split the analytical region and step S1030 for the server to determine the transmission candidate location and the reception candidate location may be sequentially performed. Unlike in the illustrated example, step S1020 may be performed after step S1030. Alternatively, step S1020 and step S1030 may be performed in parallel. The two processes may be performed regardless of their sequence.

Next, the server sets an analysis condition for the split regions (S1040). The analysis condition may mean one or more values or parameters for simplification in a process of performing simplified analysis on the split regions. A process of setting the analysis condition is specifically described with reference to FIG. 11.

When the analysis condition is set, the server performs simplified analysis on each split region (S1050). If the results of the simplified analysis satisfy a given reference value, the server may proceed to step S940 of FIG. 9 and perform full simulations on the entire analytical region. If the results of the simplified analysis do not satisfy the reference value, however, the process may be performed from step S1020 of splitting the analytical region.

Figure 11:
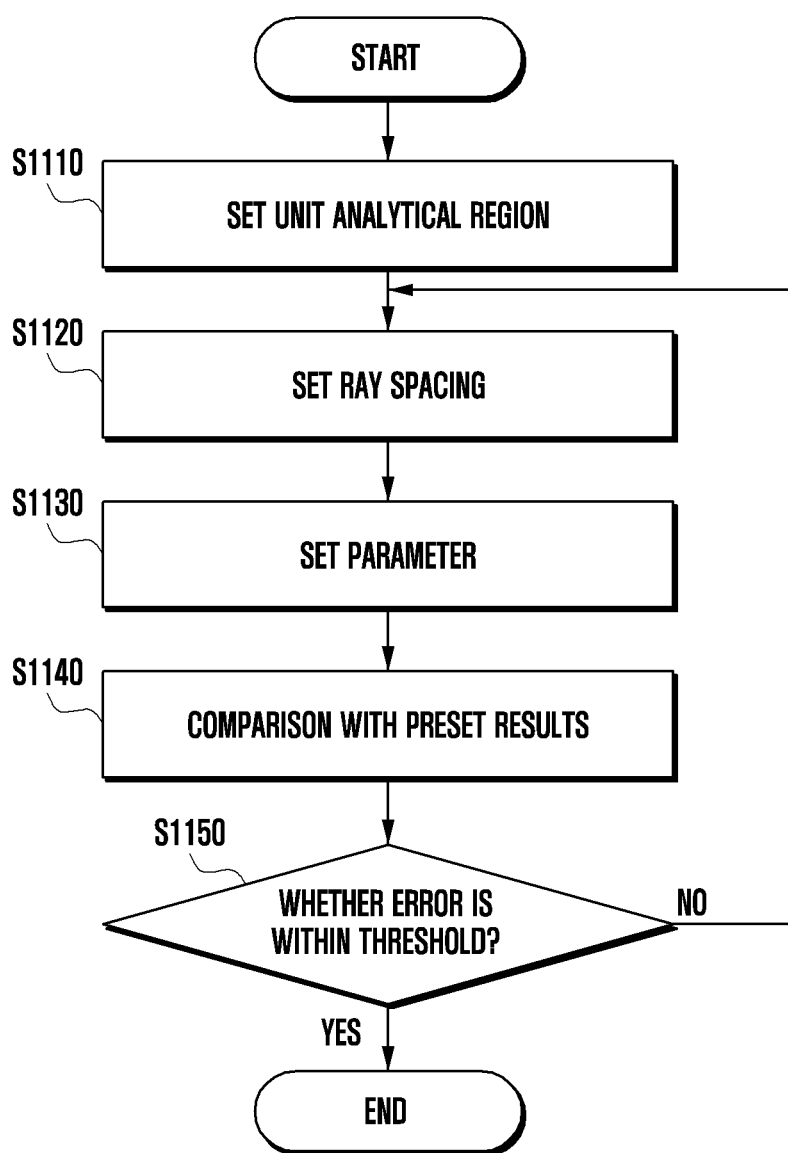
FIG. 11 is a flowchart describing an analysis method according to a proposed embodiment.

FIG. 11 is a flowchart describing an analysis method according to a proposed embodiment. The process of setting an analysis condition for simplified analysis, described in step S1040 of FIG. 10, is specifically described with reference to FIG. 11.

The simplified analysis may mean that the RT method is simply applied to each of a plurality of split regions or an RT method having an improved computation speed is performed. That is, the simplified analysis may mean that the time taken for a process of performing the RT method has been reduced by adjusting one or more parameters. In this case, one split region becomes a unit analytical region because the simplified analysis is performed on a plurality of split regions. One split region may be recognized as two or more unit analytical regions if two or more transmission candidate locations are present within one split region in that the RT method is performed based on a process of analyzing the path along which a signal is transmitted from a given location. In other words, the server sets a unit analytical region on which simplified analysis is to be performed (S1110). The unit analytical region may mean each split region or may mean a region covered by each transmission candidate location included in a split region.

Next, the server sets ray spacing (S1120). The ray spacing may mean the interval between a plurality of rays taken into consideration in an analysis process according to the RT method. As the ray spacing is set to be larger, a total number of rays that need to be taken into consideration are reduced. Accordingly, an analysis process can be rapidly performed. In contrast, as the ray spacing is set to be smaller, a total number of rays that need to be taken into consideration is increased, the accuracy of an analysis process can be improved.

Next, the server sets a parameter for analysis (S1130). The parameter may mean at least one of R/D/T values taken into consideration in an analysis process according to the RT method. In this case, R may mean reflection, D may mean diffraction, and T may mean transmission. As parameters are set as smaller values, an analysis process can be rapidly performed. As parameters are set as greater values, the accuracy of analysis results can be improved.

That is, the server may adjust an input value in the process of S1120 and S1130 in order to perform simplified analysis. Step S1120 and step S1130 may be performed at the same time or in the sequence opposite the illustrate sequence.

When the ray spacing and the parameter are set, the server performs a comparison with preset results by performing a simplified analysis process (S1140). The simplified analysis process is performed on all of the plurality of unit analytical regions. The server may select a given number of result values obtained by performing simplified analysis on all the unit analytical regions, and may compare the selected result value with a preset result value. In this case, the preset result value means a target value for a comparison between simplified results according to the ray spacing and parameter input in steps S1120 and S1130, and may be a previously known value (or a result value input by a user) calculated based on given ray spacing and parameter.

If a result error of the comparison between a given number of result values of the results obtained by performing the simplified analysis on all the unit analytical regions and the preset result value is within a threshold (S1150), this may mean that the simplified analysis has derived reliable results. In such a case, the server performs a full analysis process because the results of the execution of the simplified analysis through the split regions are sufficiently reliable. Accordingly, the reliability of results can be sufficiently guaranteed although a full analysis process is performed because the results have been verified to be reliable through the simplified analysis.

In contrast, if a result error of the comparison between a given number of result values of the results obtained by performing the simplified analysis on all the unit analytical regions and the preset result value exceeds the threshold (S1150), the server may set ray spacing and a parameter again and performs simplified analysis again. In this case, the server may adjust the ray spacing and parameter as numerical values for improving the accuracy of analysis in the re-execution process.

If an error is not reduced within the threshold although the parameter is adjusted in the simplified analysis, a process of splitting the split region and a process of determining a reception candidate location and a transmission candidate location need to be performed again. That is, if necessary, the server may proceed to step S930 in which results analyzed for the split regions do not satisfy a reference value, and may perform S920 and the process of FIG. 10 again. In such a re-execution process, split regions may be determined to be a different number or a transmission candidate location and reception candidate location may be adjusted, added and/or deleted. Simplified analysis is performed based on a condition changed through the re-execution. If a result error of a comparison between the results of the simplified analysis and preset results is reduced within the threshold, a full analysis process will be performed.

The embodiment described in FIG. 11 is described from the user viewpoint of the server. If the server receives a given value and parameter in S1120 and S1130, this may mean that the server's user inputs the corresponding value and parameter. That is, the server's user inputs a given result value (or a value when it is an exact solution) that will becomes a target of comparison in S1140, and inputs a desired parameter and value in S1120 and S1130. The user may adjust the parameter/value in S1120 and S1130 based on a result of a comparison between the input value and a result value, that is, a target of comparison, and may adjust a value, that is, a target of comparison.

According to the embodiments described in FIGS. 9 to 11, the server can reduce a burden of repeatedly performing a full analysis process including a relatively long time by performing simplified analysis on the split regions prior to the full analysis process for the analytical region.

The embodiments in which an analysis process for a network design is performed using the RT method have been described above. However, the RT method is merely an example of description, and various other methods for incorporating the electromagnetic wave characteristics of a 5G communication system may be used. If another method is used, the type of aforementioned parameters or values may be changed based on a given method and the sequence of the aforementioned embodiments may be partially changed.

The analysis method for a network design has been described above. However, the aforementioned embodiments may also be applied to a network operation process after a network design identically or similarly.

For example, the server that performs the aforementioned analysis method and a base station installed in a transmission candidate location may share analysis results. In such a case, the base station may use corresponding results for a process of controlling beamforming and/or transmission power n a communication process because the base station is aware that the server has selected the transmission candidate location based on the aforementioned process and analysis results have been determined to be reliable.

In other words, if the top of a building is selected as a given transmission candidate location, a base station positioned at the corresponding transmission candidate location can be aware that it has to cover which region. Alternatively, the base station can be aware that it has to support a reception stage by transmitting a beam to which direction. Accordingly, the corresponding base station may perform efficient beamforming on a direction to be covered, and can also selectively perform power control for the transmission of a signal. Accordingly, the base station can efficiently operate in terms of power control.

According to another embodiment, topography within an area may be changed during a network operation, a transmission candidate location may be changed because a building/structure is newly installed, or the progress path of an electromagnetic wave may be changed. In such a case, the aforementioned embodiment may be used as a scheme for network advancement. For example, if a base station needs to be additionally deployed due to an increased population density within a given area, a server and/or a base station may perform analysis by adjusting some conditions or values instead of performing fully new computation by improving the aforementioned analysis results (transmission candidate location, reception candidate location and split region deployment). The reason for this is that if an already deployed base station is present, a determination of a candidate location to be taken into consideration for additional deployment can be computed relatively simply.

For another example, if the progress path of an electromagnetic wave needs to be newly computed because a large building is newly installed in an area, a server and/or a base station may perform analysis again using the existing analysis results. In other words, prior to full analysis in which a new structure is taken into consideration, the server and/or the base station may adjust some values or parameters of the existing simplified analysis process and compare the adjusted values or parameters with a given target value of comparison. Accordingly, the time taken for a new analysis process is significantly reduced.

Even in such a network advancement process, a base station can efficiently perform an operation process with a terminal by sharing an analysis process and corresponding results with a server as described above.

Figure 12:
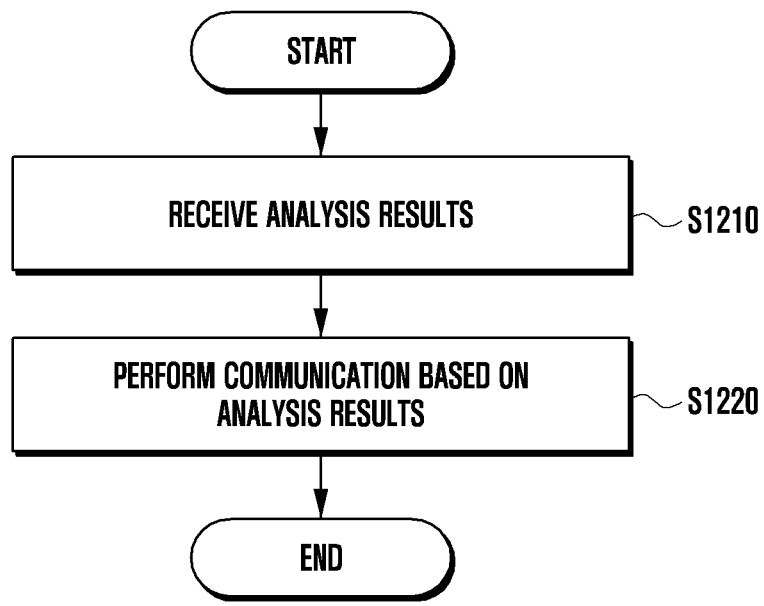
FIG. 12 is a flowchart describing an operating method according to a proposed embodiment.

FIG. 12 is a flowchart describing an operating method according to a proposed embodiment. A process for a transmission stage (i.e., base station) to perform communication using analysis results after analysis is performed based on the embodiments described in FIGS. 9 to 11 is described with reference to FIG. 12. The base station receives analysis results from a server (or computing apparatus) that performs analysis (S1210). Such analysis results may include simplified analysis results for an analytical region in addition to the results of the full analysis.

Next, the base station performs communication based on the received analysis results (S1220). The base station may perform communication with a terminal by performing beamforming or controlling power so that a split region taken into consideration in the analysis process can be covered.

Figure 13:
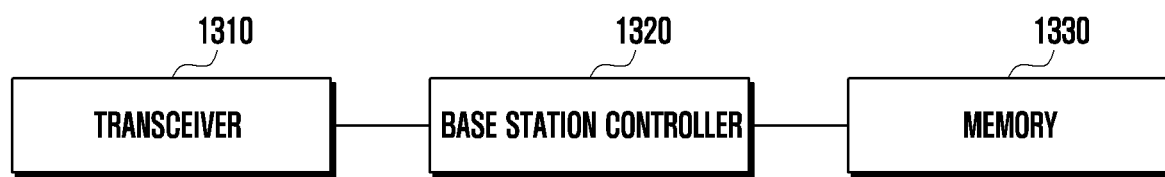
FIG. 13 is a block diagram illustrating the configuration of a base station according to an embodiment of the disclosure.

FIG. 13 is a block diagram illustrating the configuration of a base station according to an embodiment of the disclosure.

Referring to FIG. 13, the base station may include a transceiver 1310, a base station controller 1320, and a storage unit 1330. In the disclosure, the base station controller 1320 may be defined as a circuit or an application-specific integrated circuit or at least one processor.

The transceiver 1310 may transmit and receive signals to and from another network entity. The transceiver 1310 may exchange analysis results by performing communication with a server, for example, and may perform communication with a terminal.

The base station controller 1320 may control an overall operation of the base station according to an embodiment proposed in the disclosure. For example, the base station controller 1320 may control signal flow between blocks so that an operation according to the aforementioned drawing and flowchart is performed. Specifically, the base station controller 1320 may communicate with a server that performs an analysis method for a network design, may receive an analysis method, and may identify an analysis method and analysis results so that efficient communication can be performed.

The storage unit 1330 may store at least one of information transmitted and received through the transceiver 1310 or information generated through the base station controller 1320.

Figure 14:
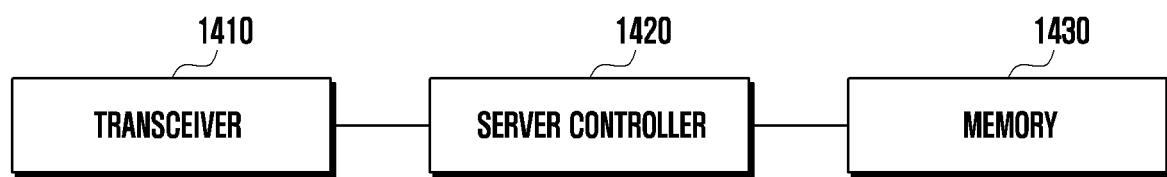
FIG. 14 is a block diagram illustrating the configuration of a computing apparatus according to an embodiment of the disclosure.

FIG. 14 is a block diagram illustrating the configuration of a computing apparatus (e.g., server) according to an embodiment of the disclosure.

Referring to FIG. 14, the server may include a transceiver 1410, a server controller 1420, and a storage unit 1430. In the disclosure, the server controller 1420 may be defined as a circuit or an application-specific integrated circuit or at least one processor.

The transceiver 1410 may transmit and receive signals to and from another network entity. The transceiver 1410 may communicate with an external entity, for example, and may obtain map data or may transmit analysis results to a base station.

The server controller 1420 may control an overall operation of the server according to an embodiment proposed in the disclosure. For example, the server controller 1420 may control a signal flow between blocks so that an operation according to the aforementioned drawing and flowchart is performed. Specifically, the server controller 1420 may split an analytical region from map data, may set a transmission location and reception location for each split region, and may perform an analysis process for each split region based on an analysis condition.

The storage unit 1430 may store at least one of information transmitted and received through the transceiver 1410 or information generated through the server controller 1420.

Furthermore, the base station controller 1320 and the server controller 1420 may be controlled by a program including instructions that execute the methods described in the embodiments of the specification. Furthermore, the program may be stored in a storage medium. The storage medium may include a volatile or non-volatile memory. The memory may be a medium capable of storing data, and is not limited to its type if the memory can store the instructions.

The embodiments of the disclosure described in the specification and drawings propose only specific examples in order to easily describe the contents of the disclosure and help understanding of the disclosure, and are not intended to restrict the scope of the disclosure. Accordingly, all of modifications or variations derived based on the technical spirit of the disclosure should be construed as being included in the scope of the disclosure in addition to the disclosed embodiments.

The invention claimed is:

1. A method performed by a computing apparatus for a network design in a wireless communication system, comprising:
   obtaining map data for an analytical region, the map data including topography of the analytical region and geographic features located in the analytical region;
   splitting the analytical region into a plurality of split regions based on the map data;
   setting a condition for a ray tracing analysis with respect to the plurality of split regions;
   performing the ray tracing analysis on each of the plurality of split regions based on the condition and the map data;
   identifying whether an error between a result of the ray tracing analysis on each of the plurality of split regions and a preset result is within a threshold;
   performing communication simulation on the analytical region based on the result of the ray tracing analysis, in case that the error is within the threshold,
   wherein the ray tracing analysis is performed using a mmWave frequency band, and
   wherein the communication simulation is performed for the network design.

2. The method of claim 1,
   wherein the condition for the ray tracing analysis is associated with at least one parameter of ray spacing, reflection, diffraction, or transmission in a ray tracing (RT), and
   wherein a computation speed of the ray tracing analysis is improved based on the at least one parameter.

3. The method of claim 1, wherein splitting the analytical region is performed further based on information on at least one of a transmission speed, a transmission capacity, a transmission distance, a bandwidth, a modulation and coding scheme (MCS), a number of antennas, an antenna gain, a number of RF chains, transmission power for each RF chain, effective isotropic radiated power (EIRP), a noise figure (NF) or sensitivity which is an index indicative of performance of a transmitter or receiver.

4. The method of claim 1, further comprising determining a transmission candidate location and a reception candidate location within the analytical region using the map data,
   wherein the transmission candidate location is determined based on information on at least one of a beam width of a transmitter, an installation height of the transmitter, whether a transmitter is to be down tilted, a range of the down tilting of the transmitter, a road width, or a deployment of buildings.

5. The method of claim 1, further comprising determining a transmission candidate location and a reception candidate location within the analytical region using the map data,
   wherein the reception candidate location is determined based on at least one of information indicative of a local characteristic of the analytical region or information indicative of a deployment scenario of the analytical region.

6. The method of claim 1, further comprising transmitting the result of the ray tracing analysis to a base station positioned in the analytical region, the base station communicating with a terminal based on the result of the ray tracing analysis.

7. A computing apparatus for a network design in a wireless communication system, the computing apparatus comprising:
   a transceiver configured to transmit and receive a signal; and a controller coupled with the transceiver and configured to:
      obtain map data for an analytical region, the map data including topography of the analytical region and geographic features located in the analytical region,
      split the analytical region into a plurality of split regions based on the map data,
      set a condition for a ray tracing analysis with respect to the plurality of split regions,
      perform the ray tracing analysis on each of the plurality of split regions based on the condition and the map data,
      identify whether an error between a result of the ray tracing analysis on each of the plurality of split regions and a preset result is within a threshold, and
      perform communication simulation on the analytical region based on the result of the ray tracing analysis, in case that the error is within the threshold,
   wherein the ray tracing analysis is performed using a mmWave frequency band, and
   wherein the communication simulation is performed for the network design.

8. The computing apparatus of claim 7,
   wherein the condition for the ray tracing analysis is associated with at least one parameter of ray spacing, reflection, diffraction, or transmission in a ray tracing (RT), and
   wherein a computation speed of the ray tracing analysis is improved based on the at least one parameter.

9. The computing apparatus of claim 7, wherein the controller is configured to split the analytical region into the plurality of split regions further based on information on at least one of a transmission speed, a transmission capacity, a transmission distance, a bandwidth, a modulation and coding scheme (MCS), a number of antennas, an antenna gain, a number of RF chains, transmission power for each RF chain, effective isotropic radiated power (EIRP), a noise figure (NF) or sensitivity which is an index indicative of performance of a transmitter or receiver.

10. The computing apparatus of claim 7,
    wherein the controller is configured to determine a transmission candidate location and a reception candidate location within the analytical region using the map data, and
    wherein the transmission candidate location is determined based on information on at least one of a beam width of a transmitter, an installation height of the transmitter, whether a transmitter is to be down tilted, a range of the down tilting of the transmitter, a road width, or a deployment of buildings.

11. The computing apparatus of claim 7,
    wherein the controller is configured to determine a transmission candidate location and a reception candidate location within the analytical region using the map data, and wherein the reception candidate location is determined based on at least one of information indicative of a local characteristic of the analytical region or information indicative of a deployment scenario of the analytical region.

12. The computing apparatus of claim 7, wherein the controller is configured to transmit the result of the ray tracing analysis to a base station positioned in the analytical region, the base station communicating with a terminal based on the result of the ray tracing analysis.

* * * * *